United States Patent [19]

Vuillamy et al.

[11] Patent Number: 5,450,720
[45] Date of Patent: Sep. 19, 1995

[54] ROCKET ENGINE NOZZLE HAVING A NOTCHED DIVERGING PORTION

[75] Inventors: Didier Vuillamy, Quincampoix; Pierre-André Baudart, Vernon; Etienne Tiret, La Chapelle Reanville; André Beaurain, Chambly, all of France

[73] Assignee: Societe Europeenne de Propulsion, Suresnes, France

[21] Appl. No.: 249,140

[22] Filed: May 25, 1994

[30] Foreign Application Priority Data

May 28, 1993 [FR] France ............... 93 06453

[51] Int. Cl.⁶ .................................... F02K 1/00
[52] U.S. Cl. ......................... 60/271; 239/265.17
[58] Field of Search .......... 60/271, 242, 232, 231; 239/265.11, 265.17

[56] References Cited

U.S. PATENT DOCUMENTS

| | | | |
|---|---|---|---|
| 2,395,114 | 2/1946 | Goddard | 60/271 |
| 2,875,577 | 3/1959 | Odenkirchen | 60/271 |
| 3,304,722 | 2/1967 | Culpepper | 60/271 |
| 3,354,645 | 11/1967 | Hsia | 60/231 |
| 3,925,982 | 12/1975 | Mueller | 60/242 |
| 4,707,981 | 11/1987 | Wagner | 60/265.17 |

FOREIGN PATENT DOCUMENTS

| | | | |
|---|---|---|---|
| 165369 | 9/1953 | Australia | 60/271 |
| 2021803 | 7/1970 | France . | |
| 2457390 | 12/1980 | France . | |
| 2503794 | 10/1982 | France . | |
| 256831 | 7/1985 | France . | |
| 2618488 | 1/1989 | France . | |
| 2053820 | 2/1981 | United Kingdom | 60/271 |

OTHER PUBLICATIONS

Liepmann et al., *Elements of Gas Dynamics*, New York, Wiley & Sons, Inc., 1967. pp. 124–132.

*Primary Examiner*—Timothy S. Thorpe
*Attorney, Agent, or Firm*—Weingarten, Schurgin, Gagnebin & Hayes

[57] ABSTRACT

In a rocket engine nozzle comprising: a converging portion that receives the gases produced in a combustion chamber; a throat of small section; and a diverging portion connected to the nozzle throat; the diverging portion includes a set of downstream notches running longitudinally from its downstream end and uniformly distributed around the entire periphery of the diverging portion, the total width of all of the notches within any section representing about 1% to 6% of the periphery of the diverging portion. The notches serve to avoid having a jet separation line that is irregular and unstable, and they facilitate matching the diverging portion to ambient conditions that vary in flight.

12 Claims, 3 Drawing Sheets

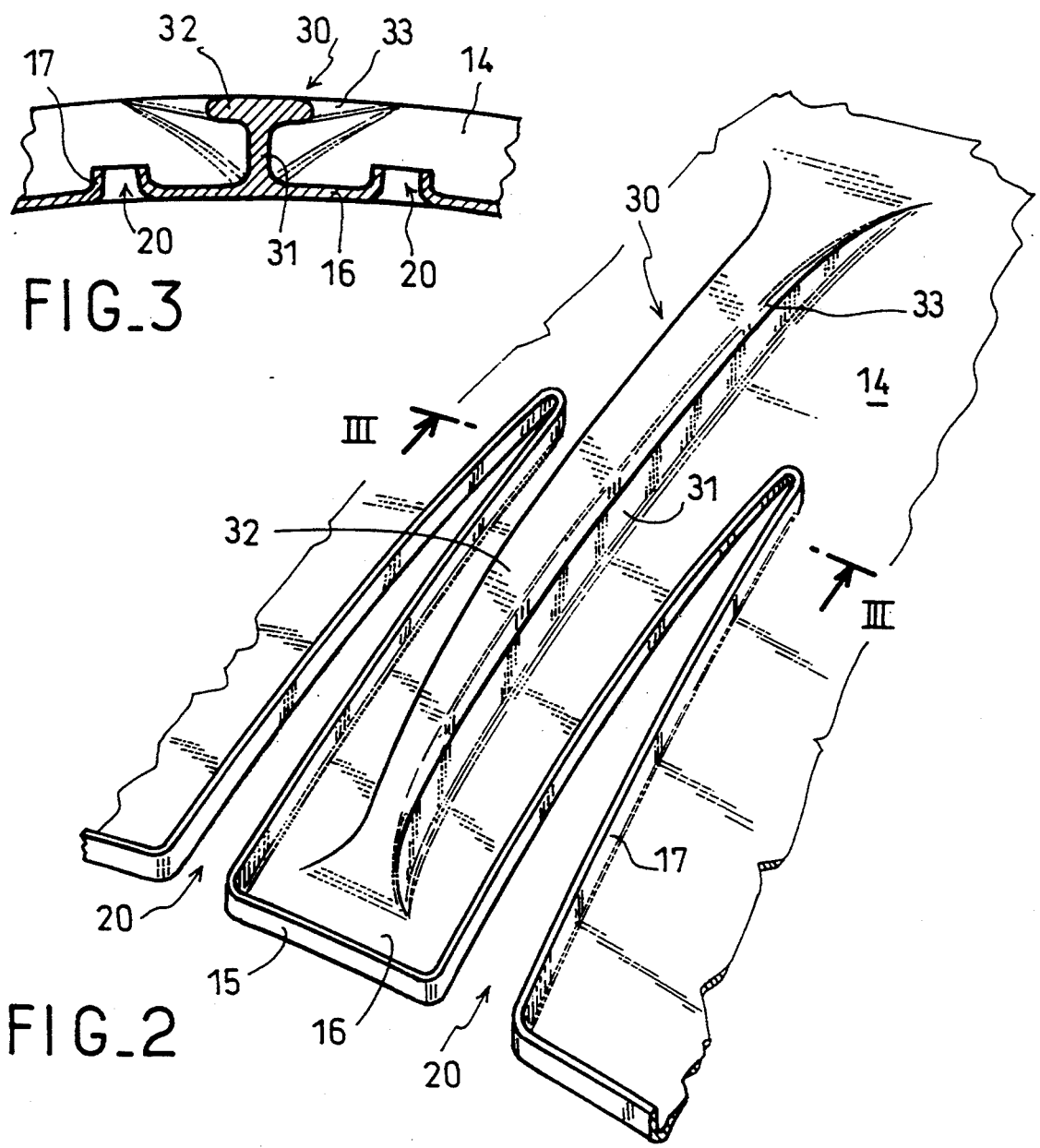

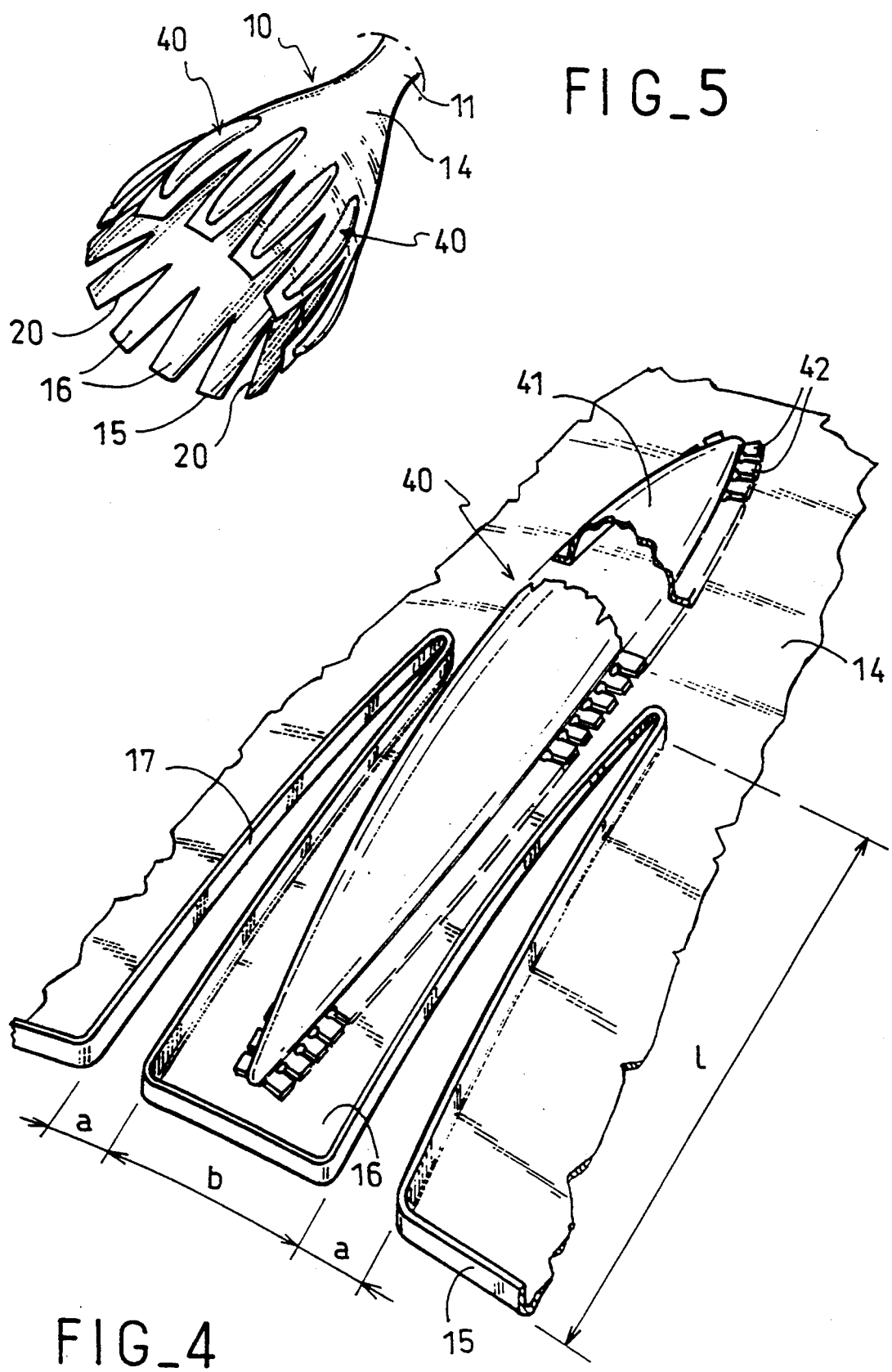

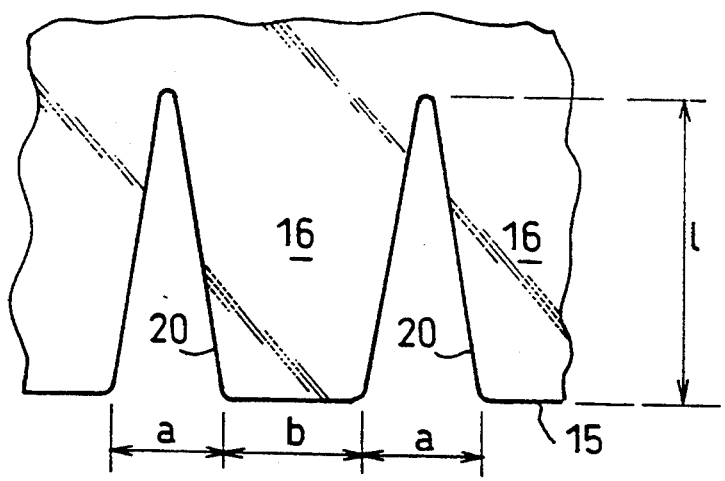
FIG_6
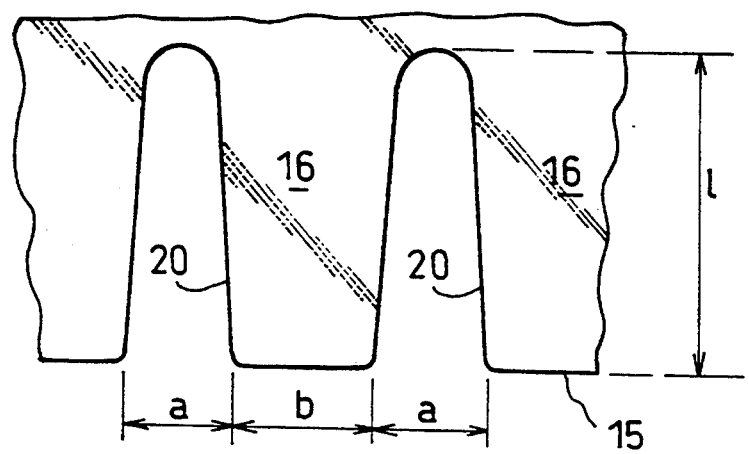
FIG_7
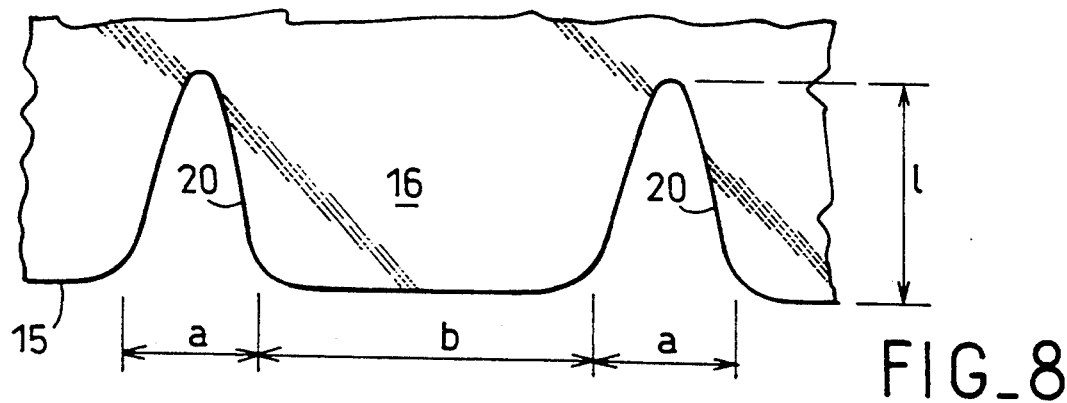
FIG_8

ROCKET ENGINE NOZZLE HAVING A NOTCHED DIVERGING PORTION

FIELD OF THE INVENTION

The invention relates to rocket engine nozzles, and more particularly to nozzles designed to operate in an external medium of varying pressure, the nozzle including means for adapting its diverging portion to ambient conditions that vary in flight.

PRIOR ART

At any given rate of operation, the nozzle of a rocket engine used for propelling a first stage of a launcher can be accurately matched to its environment only at a single altitude that corresponds to a specific ambient pressure. Nozzles are generally optimized as a function of the overall performance of a stage, which means that most of the time nozzles provide too much expansion and provide thrust that is at a maximum only at a relatively high "matched" altitude. At the matched altitude, the static pressure Pe of the gases in the outlet section of the nozzle becomes equal to an ambient pressure Pa that is relatively low. For example, the matched altitude may be situated, at about 10 km above the ground. Throughout flight from the ground up to the matched altitude, the static pressure Pe of the gas in the outlet section of the nozzle is very significantly less than ambient pressure. During this stage in which the nozzle provides too much expansion, and in particular when starting where ambient pressure Pa corresponds to atmospheric pressure at ground level, there exists a phenomenon whereby the jet becomes separated from the wall of the diverging portion, thus limiting the gas expansion ratio, i.e. the ratio between the pressure Po inside the combustion chamber and the static pressure Pe of the gas in the outlet section of the nozzle.

In order to avoid the phenomenon of the jet separating, proposals have already been made, e.g. in document FR-A-2 503 794, to make use when starting and at low altitude of a diverging portion whose outlet section is reduced and which is installed inside a diverging portion of greater outlet section. When the rocket engine reaches an altitude such that the larger section diverging outlet portion can operate without any risk of the jet separating, the smaller section internal diverging portion is separated and released.

Such a system of matching a rocket engine nozzle is not entirely satisfactory since it requires the small internal diverging portion to be connected in the throat of the nozzle which is at a very high temperature, thus making implementation relatively complex. The implementation of two complete nozzles that are nested like Russian dolls also tends to increase the mass of the assembly.

Proposals have also been made, in particular in documents FR-A-2 568 316 and FR-A-2 457 390 to make nozzles of variable geometry comprising a first diverging portion of relatively short length and small outlet section for use during the first stage of flight from the ground, together with one or more lengths of diverging portion that engage the downstream end of said first diverging portion so as to extend it and create an outlet section that is larger once the rocket engine has achieved a certain altitude at which ambient pressure is lower. Such types of nozzle having a deployable diverging portion make it possible to improve the matching of the rocket engine to various stages of flight, but they also imply increased complexity of implementation, of cost, and of on-board mass, and they do not always guarantee sufficient operating security given the fragility of the deployment mechanisms and the difficulty of achieving proper alignment between the various lengths of the diverging portion in the presence of loads due to the jet sticking to said length.

In addition to problems associated with the deployment system proper, the use of a deployable diverging portion in a rocket engine also gives rise to constraints in the architecture of the engine.

It is also known, in particular from documents U.S. Pat. No. 3,925,982 or FR-A-2 618 488 to use a diverging portion of fixed section ratio, in which the relatively large outlet section optimizes operation at altitude in a low pressure external environment, and to use means on starting and during a first stage of flight at low altitude for stabilizing the separation of the gas jet from the wall of the diverging portion at a determined distance from the outlet section. However, proposals made in the past for stabilizing separation of the jet have relied essentially on injecting fluid in the form of a ring through the wall of the diverging portion. The requirement of using a fluid and of controlling its injection into the diverging portion increases the complexity of the system and tends to reduce its reliability.

OBJECT AND BRIEF DESCRIPTION OF THE INVENTION

The present invention seeks to remedy the above-specified drawbacks and to enable a rocket engine nozzle to be well adapted to various conditions of flight from the ground up to an altitude where ambient pressure is low, without it being necessary to implement any additional parts in the vicinity of the throat of the nozzle, or any deployment mechanism for deploying parts that extend the diverging portion, or any system for injecting fluid.

The invention seeks to use static means only to impart significant matching ability to the nozzle of a rocket engine so as to obtain satisfactory overall efficiency, and enabling the problems associated with the phenomenon of jet separation to be remedied.

These objects are achieved by means of a rocket engine nozzle having a notched diverging portion, the nozzle comprising a converging portion receiving the gases produced in a combustion chamber, a throat of small section [So], and a diverging portion connected to the throat and terminating at its downstream end in a gas outlet section [Se] defining a high section ratio [$\epsilon$=Se/So] greater than about 50, wherein the diverging portion includes a set of downstream notches running longitudinally from its downstream end and regularly spaced apart around the entire periphery of the diverging portion, the total width of the set of notches constituting in each section about 1% to 6% of the periphery of the diverging portion.

Preferably, the total width of the set of notches in each section represents about 2% to 3% of the periphery of the diverging portion.

The number of notches may lie in the range 8 to 20, and preferably in the range 10 to 15.

Advantageously, the lobes defined by the non-notched downstream areas of the diverging portion have a downstream end width lying in the range 50 cm to 80 cm.

In general, the notches begin upstream from or in the vicinity of the section of the diverging portion at which the jet separates at ground level in a diverging portion having the same dimensions but no notches.

According to a particular feature, the nozzle of the invention includes reinforcing members disposed on the outside of the diverging portion, between the notches, and extending longitudinally on either side of the section of the diverging portion at which the notches begin.

In a first possible embodiment, the nozzle is made of composite materials, and the reinforcing elements are constituted by shaped ribs integrally formed with the diverging portion.

In another possible embodiment, the nozzle is made of metal materials and the reinforcing elements are constituted by pod-shaped ribs applied to the metal diverging portion.

The notches may flare progressively towards the downstream end of the diverging portion.

By means of the notches or longitudinal slots formed in the downstream end of the diverging portion, the invention makes it possible to use purely static means to cause the jet of hot gases in the diverging portion to separate therefrom during the first stage of flight at low altitude above the ground. The notches which are uniformly distributed around the periphery of the diverging portion make it possible to avoid having a separation line for the jet that is irregular and unstable, but has no effect on the thrust coefficient which remains unchanged.

The limit on the total width of the notches at the periphery of the diverging portion prevents the leakage flow of hot gases through the notches constituting a difficulty for the environment of the rocket engine outside the nozzle. The absence of any moving part guarantees operation that is stable and reliable, and facilitates physical building of the diverging portion.

BRIEF DESCRIPTION OF THE DRAWINGS

Other characteristics and advantages of the invention appear from the following description of particular embodiments given by way of example and described with reference to the accompanying drawings, in which:

FIG. 1 is a diagrammatic half view in perspective showing the principle of the invention whereby notches are formed in a rocket engine nozzle;

FIG. 2 is a fragmentary perspective view of part of the downstream end of a diverging portion of a nozzle of the invention made of composite materials;

FIG. 3 is a section view on line III—III of FIG. 2;

FIG. 4 is a partially cutaway fragmentary perspective view of part of the downstream end of a diverging portion of a nozzle of the invention made out of metal parts;

FIG. 5 is a perspective view of the entire diverging portion of a nozzle implementing the embodiment of FIG. 4; and FIGS. 6 to 8 show various configurations of notches that may be implemented in the diverging portion of a rocket engine nozzle of the invention.

DETAILED DESCRIPTION OF PARTICULAR EMBODIMENTS OF THE INVENTION

FIG. 1 shows the general shape of a rocket engine nozzle 10 comprising an upstream converging portion 12 that receives the hot gases produced in a combustion chamber 13, a throat 11, and a diverging portion 14 which allows the hot gases to expand downstream from the throat 11 and which ejects them via a downstream end 15 of the diverging portion which has an outlet section Se.

The section ratio $\epsilon$ between the outlet section Se of the diverging portion and the section So where the hot gases pass through the throat 11 defines an expansion ratio. The expansion ratio of the nozzle 10 is defined as the ratio between the pressure Po in the combustion chamber and the static pressure of the gas Pe in the outlet section of the nozzle, and the expansion ratio depends directly on the section ratio $\epsilon$.

In general, it is desirable to have an expansion ratio, and thus a section ratio $\epsilon$, that is as large as possible, in order to obtain large thrust.

As has already been mentioned, thrust is nevertheless at a maximum only if the nozzle is matched, i.e. if the static pressure of the gas Pe in the outlet section of the nozzle is equal to the pressure Pa of the ambient medium.

If the nozzle is matched to operate at high altitude where ambient pressure Pa is very low, then the nozzle provides too much expansion at ground level where the static pressure Pe of the gas in the outlet section of the nozzle is much less than ambient pressure Pa which is then equal to 1 bar so with conventional diverging portions there arises a phenomenon whereby the jet of hot gases separates from the wall of the diverging portion 14. Because of the instabilities in the mechanical loads it causes on the diverging portion, this phenomenon of jet separation can cause the diverging portion to be destroyed.

That is why proposals have already been made either to implement relatively complex means for stabilizing jet separation by using gas injection systems, or more generally for limiting the length of the diverging portion and its outlet section so that the phenomenon of jet separation is avoided at low altitude. This gives rise to a loss of thrust at high altitude or to the need to add nozzle extension systems for use at high altitude, thereby greatly complicating overall structure and making it more fragile.

Consideration is given by way of example to a conventional rocket engine nozzle for the first stage of a launcher, in which the section ratio is limited to $\epsilon=45$ so as to guarantee that no jet separation can occur at ground level or at very low altitude. This corresponds to a nozzle which is matched to an external pressure of the order of 0.4 bar, but which provides too little expansion for external pressures that are less than 0.4 bar, i.e. at altitudes greater than 8 km to 10 km. Thrust therefore remains limited throughout all stages of flight that take place at an altitude of greater than about 10 km.

The invention offers a simple way of improving the matching of a nozzle over a greater operating range by stabilizing the phenomenon of jet separation at low altitude and by enabling the nozzle to have a shape whose section ratio $\epsilon$ is high, thereby ensuring good matching and consequently improved thrust to be obtained at high altitudes (above about 10 km) where ambient pressure is low.

To do this, downstream longitudinal notches 20 are formed in the diverging portion 14 running from its very end 15 and uniformly distributed around the entire periphery of the diverging portion. The downstream areas between the notches of the diverging portion 14 constitute lobes 16 which extend the non-notched upstream area of the diverging portion 14.

The upstream ends of the notches or slots 20 are located close to the position where the section of the diverging portion is such that the jet would separate therefrom at ground level if the diverging portion were not notched. For example, given the characteristics of the nozzle, if the jet were likely to become separated at a section $S_1$ of the diverging portion that defines a section ratio ($\epsilon_1 = S_1/S_0$) of the order of 45, then the notches 20 could begin either level with the section $S_1$, or else a little upstream therefrom, e.g. at a section $S_2$ of the diverging portion that defines a section ratio ($\epsilon_2 = S_2/S_0$) of the order of 25 which could correspond to a pressure inside the diverging portion of about 1 bar, thereby improving operation at ground level.

The notches 20 formed in the downstream part of the diverging portion force and stabilize separation of the jet at low altitude, thereby making it possible to define a section ratio ($\epsilon = S_e/S_0$), e.g. of the order of 80 to 100, that is greater than the section ratio that would have been possible without the means for stabilizing the separation of the jet. Overall, the nozzle of the invention provides good average matching of the jet during flight and provides thrust gains of the order of several percent (e.g. 3% to 7%) at altitudes greater than 10 km compared with conventional nozzles in which the outlet section is limited in order to avoid jet separation on starting.

The open fraction represented by the notches 20 does not have any effect on the gain in thrust. However, in order to avoid leakage flow rates of hot gases at high altitude that are substantially proportional to the open fraction represented by the notches 20, the width of the notches should be restricted to a small percentage of the periphery of the diverging portion.

Thus, it is appropriate for the total width of all of the notches 20 to constitute in each section of the diverging portion a percentage that is less than 10%, e.g. of the order of 1% to 6% and preferably of the order of 2% to 3% of the total periphery of the diverging portion 14.

At high altitude, the percentage represented by the leakage flow rate of hot gases through the notches may be evaluated at 2% when the notches 20 represent only 1% of the periphery of the diverging portion, and at 12% when the notches 20 represent 10% of the periphery of the diverging portion.

Insofar as 2% to 3% of notch over the circumference of the diverging portion 14 is sufficient to obtain good stability in the phenomenon of jet separation, assuming the notches are uniformly distributed, it is preferable to keep down to such values so that the leakage flow rate of hot gases remains negligible.

The number and shape of the notches 20 may be adapted as a function of requirements.

The number of notches 20 may normally lie in the range 6 to 15 and preferably lies in the range 8 to 12.

The lobes 16 defined by the downstream areas between the notches of the diverging portion 14 may have downstream end widths lying in the range 50 cm to 80 cm, for example.

The length of the notches 20 depends on the size of the diverging portion 14 and on the location of the upstream ends of the notches 20 relative to the theoretical location of jet separation. For example, notch length may be of the order of 70 cm to 1.20 meters (m).

FIGS. 6 to 8 show examples of various possible configurations for the notches 20. In FIGS. 6 to 8, the width a of each notch 20 is shown at the downstream end 15 of the diverging portion, as is the width b of the lobes 16 situated between the notches 20, and the length l of the notches 20. FIGS. 6 to 9 are nevertheless not drawn to scale, and as a general rule the length l of the notches 20 and the width b of the lobes 16 are much greater than the width a of the notches 20, which may be of the order of a few millimeters, for example.

The notches 20 may flare progressively towards the downstream end 15 of the diverging portion (FIGS. 6, 7, 8).

Advantageously, and as shown in FIGS. 2, 3, and 4, the notches 20 are stiffened by being outlined on the outside face of the diverging portion 14 by means of an outwardly directed rim 17.

According to a particular characteristic of the invention, the lobes 16 (FIGS. 2 to 5) have reinforcing elements 30, 40 on the outside of the diverging portion 14 between the notches 20. The reinforcing elements 30, 40 extend longitudinally on both sides of the section of the diverging portion at which the notches 20 begin.

FIGS. 2 and 3 show an example of a diverging portion 14 made of composite materials, e.g. carbon matrix carbon.

In this case, the reinforcing elements 30 may be constituted by shaped ribs integrally formed with the diverging portion 14. FIG. 3 shows one example of a rib whose section is I-shaped, including a web 31 perpendicular to the outside face of the diverging portion, a horizontal top portion 32, and a flared upstream end 33 that runs smoothly into the upstream end of the diverging portion 14. Nevertheless other rib shapes are also possible.

FIGS. 4 and 5 show an example of a metal diverging portion 14 on which pod-shaped reinforcing elements 40 are applied, said elements having a body 41, e.g. of semicircular section, and a set of fixing tabs 42 that may be welded, for example, to the outside face of the diverging portion 14. By having a multitude of fixing tabs, the bond is made flexible, thereby making it possible to distribute stresses due to expansion in operation.

From the above description it can be understood that the nozzle of the present invention is very simple and enables good efficiency to be obtained without significantly increasing total mass.

The invention makes it possible to optimize the diverging portion for operation at high altitude by means of a large outlet section.

The pressure field is maintained over the slots 20 (providing they are narrow in width), and the losses due to the flow of hot gas through the slots 20 remain low.

Close to the ground, atmospheric pressure acts on the boundary layer through the slots 20 so the jet separates where the slots 20 begin. Insofar as such separation of the jet is controlled by the presence of the uniformly distributed slots 20, it enables efficiency to be optimized without endangering the integrity of the diverging portion and without giving rise to instability.

It may be observed that various conventional methods exist for forecasting where the Jet will separate within an axially-symmetrical nozzle, and that the difficulty arises not in predicting where separation will take place, but in controlling separation so as to prevent instabilities from appearing. The implementation of slots or notches 20 provides means for stabilizing separation of the jet both simply and efficiently.

The methods of determining the location of jet separation make use of criteria that relate the properties of the flow upstream from the separation to characteristics of the flow downstream from the separation. One common method consists in calculating the non-viscous fluid flow in the nozzle so as to determine the characteristics of the flow close to the wall, and then in applying one of the separation criteria.

By way of example, if Mo represents the Mach number of the flow prior to separation, and if $P_2$ and $P_1$ represent static pressures before and after separation, then either of the following separation criteria may be selected:

Zukowski's criterion $P_2/P_1 = 1 + \frac{1}{2} Mo$

Summerfield's criterion $P_1/P_2 = (1.88 Mo - 1)^{-0.64}$

The static pressure $P_2$ downstream from separation may be taken as being equal to the external pressure.

To a first approximation, the Mach number Mo may be selected as being equal to 3. This gives the condition $P_1/P_2 \approx 0.4$.

Close to the ground, when the external pressure $P_2$ is close to 1 bar, separation takes place in this way when the static pressure $P_1$ of the ejected gas flow reaches or becomes less than about 0.4 bar.

I claim:

1. A rocket engine nozzle having a longitudinal axis and comprising a converging portion for receiving hot gases produced in a combustion chamber, a throat having a reduced section, So, in a plane perpendicular to said longitudinal axis and a diverging portion connected to the throat and having a downstream end defining a gas outlet section, Se, in a plane perpendicular to said longitudinal axis, said reduced section So and said gas outlet section Se defining a section ratio $\epsilon = Se/So$ greater than about 50, said rocket engine nozzle expelling a jet of the hot gases produced in said combustion chamber, said converging portion, said throat and said diverging portion each having an inner face and an outer face, wherein said diverging portion includes a set of notches which run upstream from said downstream end of said diverging portion and are regularly spaced apart around said diverging portion, each of said notches having a width in a direction which is perpendicular to said longitudinal axis and a length extending in a plane containing said longitudinal axis, the sum of the widths of said set of notches constituting, in each of sections of said diverging portion along said longitudinal axis, not more than about 1% to 6% of a total periphery of said diverging portion at the respective section.

2. A nozzle according to claim 1, wherein the sum of the widths of said set of notches in each of the sections of said diverging portion along said longitudinal axis represents not more than about 2% to 3% of a total periphery of said diverging portion at the respective section.

3. A nozzle according to claim 1, wherein the number of said notches lies in a range of 8 to 20.

4. A nozzle according to claim 3, wherein the number of said notches lies in a range of 10 of 15.

5. A nozzle according to claim 1, wherein portions of said diverging portion located between adjacent ones of said notches constitute lobes each having a width along said diverging portion in a direction which is perpendicular to said longitudinal axis, said width lying in a range of 50 cm to 80 cm.

6. A nozzle according to claim 1, wherein said notches begin upstream from or in the vicinity of a section of said diverging portion at which the jet of hot gases would separate at ground level if said diverging portion would have no notches.

7. A nozzle according to claim 1, including reinforcing members disposed on the outer face of said diverging portion, between said notches, and extending longitudinally on either side of a section of said diverging portion at which said notches begin upstream from said downstream end of said diverging portion.

8. A nozzle according to claim 7, wherein said nozzle is made of composite materials and wherein said reinforcing members are constituted by shaped ribs integrally formed with said diverging portion.

9. A nozzle according to claim 7, wherein said nozzle is made of metal materials and wherein said reinforcing members are constituted by pod-shaped ribs applied to said diverging portion.

10. A nozzle according to claim 1, wherein said notches flare progressively towards said downstream end of said diverging portion.

11. A nozzle according to claim 1, wherein said notches have terminal portions whose widths in said downstream end of said diverging portion are narrower than widths of said notches upstream from said downstream end.

12. A nozzle according to claim 1, wherein said notches are stiffened by being defined by a rim on the outer face of said diverging portion.

* * * * *